(12) United States Patent
Aftab et al.

(10) Patent No.: US 11,692,869 B2
(45) Date of Patent: Jul. 4, 2023

(54) MEASURING APPARATUS WITH A PASSIVE COOPERATIVE TARGET

(71) Applicant: Albert-Ludwigs-Universität Freiburg, Freiburg im Breisgau (DE)

(72) Inventors: Taimur Aftab, Freiburg im Breisgau (DE); Joachim Hoppe, Freiburg im Breisgau (DE); Di Shi, Freiburg im Breisgau (DE); Dominik Jan Schott, Freiburg im Breisgau (DE); Leonhard Michael Reindl, Wasserburg am Inn (DE)

(73) Assignee: Albert-Ludwigs-Universität Freiburg, Freiburg im Breisgau (DE)

( * ) Notice: Subject to any disclaimer, the term of this patent is extended or adjusted under 35 U.S.C. 154(b) by 203 days.

(21) Appl. No.: 16/638,147

(22) PCT Filed: Aug. 12, 2018

(86) PCT No.: PCT/DE2018/100706
§ 371 (c)(1),
(2) Date: Feb. 11, 2020

(87) PCT Pub. No.: WO2019/034206
PCT Pub. Date: Feb. 21, 2019

(65) Prior Publication Data
US 2020/0217712 A1    Jul. 9, 2020

(30) Foreign Application Priority Data
Aug. 12, 2017    (DE) .................... 10 2017 007 594.8

(51) Int. Cl.
*G01H 13/00*    (2006.01)
*H04B 1/00*    (2006.01)

(52) U.S. Cl.
CPC ........... *G01H 13/00* (2013.01); *H04B 1/0003* (2013.01)

(58) Field of Classification Search
CPC .................... H04B 1/0003–0046; H04B 11/00
See application file for complete search history.

(56) References Cited

U.S. PATENT DOCUMENTS 5,691,698 A      11/1997  Scholl
6,775,616 B1 *    8/2004  Nysen ................. G01S 7/52006
                                                340/988

(Continued)

FOREIGN PATENT DOCUMENTS

CN    106981934 A  *  7/2017
DE      4413211 A1    10/1995

(Continued)

OTHER PUBLICATIONS

Mousavi et al., Design and Simulation of One-port SAW Resonator for Wireless and High Temperature Application, IeSE 2008 Proc. 2008, Johor Bahru, Malaysia (Year: 2008).*

(Continued)

*Primary Examiner* — David L Singer
(74) *Attorney, Agent, or Firm* — CanaanLaw, P.C.; David B. Ritchie (57) ABSTRACT

A system comprising a first electroacoustic transducer connected to an interrogation unit and at least one second electroacoustic transducer connected to a resonator, wherein the first electroacoustic transducer and the second electroacoustic transducer form an acoustic channel and the second electroacoustic transducer forms with the resonator a passive cooperative target which, upon receiving an interrogation signal from the interrogation unit, transmits a response signal via the acoustic channel, and the interrogation signal has a higher energy than the response signal.

25 Claims, 5 Drawing Sheets

(56) References Cited

U.S. PATENT DOCUMENTS

| | | | |
|---|---|---|---|
| 7,061,381 B2 | 6/2006 | Forcier | |
| 2006/0267772 A1* | 11/2006 | Knadle, Jr. | G06K 7/0004 340/572.4 |
| 2007/0139165 A1 | 6/2007 | Liu | |
| 2010/0066496 A1 | 3/2010 | Cho | |
| 2011/0241482 A1* | 10/2011 | Droit | G01N 29/2481 310/313 R |
| 2014/0119162 A1* | 5/2014 | Yeary | G10K 11/24 367/178 |
| 2019/0320997 A1* | 10/2019 | Kohen | G01L 9/0008 |

FOREIGN PATENT DOCUMENTS

| | | | |
|---|---|---|---|
| DE | 10057059 A1 | 11/2003 | |
| GB | 2411239 A * | 8/2005 | B60C 23/0408 |

OTHER PUBLICATIONS

Wen et al, Detecting and Evaluating the Signals of Wirelessly Interrogational Passive SAW Resonator Sensors, IEEE Sensors Journal, vol. 4, No. 6, Dec. 2004 (Year: 2004).*

Boccard et al, High-Resolution, Far-Field, and Passive Temperature Sensing up to 700 °C Using an Isolated ZST Microwave Dielectric Resonator, IEEE Sensors Journal, vol. 16, No. 3, Feb. 1, 2016 715 (Year: 2016).*

V. Kalinin, Modelling of a Wireless Saw System for Multiple Parameter Measurement, 2001 IEEE Ultrasonics Symposium (Year: 2001).*

Reindl et al, SAW Devices as Wireless Passive Sensors, 1996 IEEE Ultrasonics Symposium (Year: 1996).*

Reindl et al., Theory and Application of Passive SAW Radio Transponders as Sensors, IEEE Transactions on Ultrasonics, Ferroelectrics, and Frequency Control, vol. 45, No. 5, Sep. 1998 (Year: 1998).*

Ultrasonic Coupled Passive Wireless Oscillating Sensor System, Aftab et al, Proceedings 2017, 1, 574; doi:10.3390/proceedings 1040574 (Year: 2017).*

Taimur Aftab et al: "Ultrasonic Coupled Passive Wireless Oscillating Sensor System", Proceedings, vol. 1, No. 4, Jan. 1, 2017 (Jan. 1, 2017), p. 574, XP955524772, DOI: 10.3390/proceedings1040574 The whole document.

Reindl L et al: "Theory and application of passive SAW radio transponders as sensors", IEEE Transactions on Ultrasonics, Ferroelectrics and Frequency Control, IEEE, US, vol. 45, No. 5, Sep. 1, 1998 (Sep. 1, 1998), pp. 1281-1292, XP01137821, ISSN: 0885-3010, DOI: 10.1109/58.726455 Figure 9.

Boccard Jean-Michel et al: "High-Resolution, Far-Field, and Passive Temperature Sensing up to 700 [deg. ]C Using an Isolated ZST Microwave Dielectric Resonator", IEEE Sensors Journal, IEEE Service Center, New York, NY, US, vol. 16, No. 3, Feb. 1, 2016 (Feb. 1, 2016), pp. 715-722, XP011591988, ISSN: 1530-437X, DOI: 10.1109/JSEN.2015.2487606 [found on Jan. 12, 2016] p. 715, col. 2.

Aftab T et al: "A parallel plate dielectric resonator as a wireless passive strain sensor", 2015 IEEE Sensors Applications Symposium (SAS), IEEE, Apr. 13, 2015 (Apr. 13, 2015), pp. 1-6, XP032788630, DOI: 10.1109/SAS.2015.7133576 [found on Jun. 24, 2015] Summary p. 1, col. 1, paragraph "1. Introduction".

Taimur Aftab et al: "Ultrasonic Coupled Passive Wireless Oscillating Sensor System", Proceedings, vol. 1, No. 1, Aug. 12, 2017 (Aug. 12, 2017), p. 574, XP955524772, DOI: 10.3390/proceedings1040574 The Whole document, Examiner notes this as "Version 2" /DLS/, Aug. 29, 2022.

Hagelauer, A.; Ussmueller, T.; Weigel, R. Saw and CMOS RFID transponder-based wireless systems and their applications. In Proceedings of the 2012 IEEE International Frequency Control Symposium (FCS), Baltimore, MD, USA, May 21-24, 2012; pp. 1-6.

Pohl, A.; Ostermayer, G.; Seifert, F. Wireless sensing using oscillator circuits locked to remote high-Q SAW resonators. IEEE Trans. Ultrason. Ferroelectr. Freq. Control 1998, 45, 1161-1168.

Kalinin, V. Comparison of frequency estimators for interrogation of wireless resonant SAW sensors. In Proceedings of the 2015 Joint Conference of the IEEE International Frequency Control Symposium & the European Frequency and Time Forum, Denver, Co, USA, Apr. 12-16, 2015; pp. 498-503.

\* cited by examiner

MEASURING APPARATUS WITH A PASSIVE COOPERATIVE TARGET

CROSS REFERENCE TO RELATED APPLICATIONS

This application is the U.S. national stage of International Application No. PCT/DE2018/100706, filed on 2018 Aug. 12. The international application claims the priority of DE 102017007594.8 filed on 2017 Aug. 12; all applications are incorporated by reference herein in their entirety.

BACKGROUND

The present invention relates to a system having a passive cooperative target.

The problem addressed by the present invention is that of providing a system which is particularly easy to handle and cost-effective, having a passive cooperative target as a measuring device.

Similar to wireless passive sensing using surface acoustic wave devices coupled to antennas, the approach presented here is based on a time domain separation of the transmitted and reflected signal. The wireless sensor system contains an excitation and receiving element with signal processing on the active part and a transceiver with an oscillating load on the passive sensor-node. The passive sensor node consists of a resonator electrically connected to a radiating element, i.e. an ultrasonic transducer.

SUMMARY

A system comprising a first electroacoustic transducer connected to an interrogation unit and at least one second electroacoustic transducer connected to a resonator, wherein the first electroacoustic transducer and the second electroacoustic transducer form an acoustic channel and the second electroacoustic transducer forms with the resonator a passive cooperative target which, upon receiving an interrogation signal from the interrogation unit, transmits a response signal via the acoustic channel, and the interrogation signal has a higher energy than the response signal.

DETAILED DESCRIPTION

This problem is solved for a measuring device of the aforementioned type according to the invention by the features of the characterizing part of a system comprising a first electroacoustic transducer connected to an interrogation unit and at least one second electroacoustic transducer connected to a resonator, wherein the first electroacoustic transducer and the second electroacoustic transducer form an acoustic channel and the second electroacoustic transducer forms with the resonator a passive cooperative target which, upon receiving an interrogation signal from the interrogation unit, transmits a response signal via the acoustic channel, and the interrogation signal has a higher energy than the response signal. Further embodiments of the invention involve a system as above wherein the interrogation unit is a software defined interrogation unit; a system wherein the first and/or the second electroacoustic transducer is an acoustic transducer for ultrasound or infrasound; a system wherein the resonator is a resonator with a high Q-factor; a system wherein the resonator stores at least a part of the energy of the interrogation signal due to the high Q-factor until an environmentally induced signal reflection of the interrogation signal has decayed; a system wherein the resonator is a thin-film resonator, a piezoelectric thin-film resonator, a dielectric resonator, or a quartz tuning fork resonator; a system wherein the resonator is a single-port resonator; a system wherein the resonator has at least one resonance frequency as a function of a measured quantity; a system wherein the resonance frequency is temperature-response compensated; a system wherein the response signal is shifted in frequency relative to the interrogation signal; a system wherein the interrogation signal is transmitted by the interrogation unit; a system wherein the interrogation signal, preferably as at least one rectangular interrogation pulse, is transmitted by a signal source other than the interrogation unit; a system wherein the passive cooperative target does not comprise active electronic components; a system wherein the passive cooperative target does not comprise its own energy source; a system wherein the passive cooperative target generates its energy required to transmit the response signal from the interrogation signal via the acoustic channel; or a system wherein the acoustic channel is located in a frequency range from 1 kHz to 10 THz.

Within the meaning of the invention, a system is preferably a measuring device for measuring a desired measurand, such as force, temperature, current, voltage, flow, humidity, and/or other physical quantities, at a preferably previously selected position. Such a measurement system according to the invention comprises a first electroacoustic transducer which is connected to an interrogation unit. Such an interrogation unit is preferably a software-defined radar system that follows the principle of software-defined radio. Software Defined Radio (SDR) is the term used to describe concepts for high-frequency transmitters and receivers in which smaller or larger portions of the signal processing are realized with software. The analog component can be a straight-line receiver or a superhet receiver. Most commonly, selection and modulation/demodulation are realized in an SDR by means of digital signal processing.

An SDR system carries out a large part of the signal processing with a general purpose computer, combined with dedicated hardware such as signal processors and/or FPGAs if required. Receiver bandwidths of several 10 MHz can be achieved with universal computers such as PCs. Larger bandwidths and more complex processing algorithms require special processors such as signal processors or FPGAs. The essential feature is that the different parameters of the radio system, such as modulation, different bandwidths, temporal behavior and different channel coding procedures, can be implemented by simply changing the software. SDR is used in amateur radio, the military and mobile communications, but also increasingly in civil applications such as digital radio receivers. In this case, flexibility and implementation of different protocol changes in real time are of particular benefit. A good and illustrative example is the implementation of base stations of cellular networks as SDR. These could thus be upgraded to new standards at low cost within a very short time. The hardware of an SDR consists of at least one transmitter and receiver module, as well as one A/D and D/A converter each and the software-based digital signal processing in between. The signal processing is usually complex in the sense that a signal path consists of a pair of two parallel real number sequences, which is also called an I/Q signal. The simplest and ideal SDR receiver would consist of an analog to digital converter with antenna. The read out data would then be processed by a digital computer directly after the analog-digital conversion. The ideal transmitter would look similar: A computer generates a digital data stream via a digital-analog converter and a downstream antenna transmits it.

Operating Principles of SDRs

Today's SDRs operate according to one of three functional principles:

Direct Digitization of the Input Signal

The input signal is digitized directly after the most economical analog processing by filters and preamplifiers or attenuators. According to the Nyquist theorem, the input signal for digitizing must be sampled at at least twice the maximum useful frequency in order to reconstruct the signal. Nowadays, there are ND converters with sampling frequencies up to 3.6 GSPS at 12 bit resolution. This enables reception ranges of up to 1500 MHz.

Digitization at Intermediate Frequency Level

The first stages of such a receiver differ little from a conventional superheterodyne receiver. The analog filters are designed for the largest useful signal bandwidth used. This not only reduces the requirements for high signal strength for further processing, it also allows the sampling frequency to be drastically reduced: at an intermediate frequency bandwidth of 10 kHz, for example, a sampling frequency of just 20 kHz is sufficient (subsampling). This concept is now widely used because a sufficiently powerful digital signal processor (DSP) is significantly cheaper than various crystal filters with the required bandwidths. In addition, the DSP can also perform other functions such as gain control and demodulation—with significantly better characteristics and more possibilities than conventional analog technology.

Direct Mixer According to the I/Q Method

Direct mix receiver is a receiver concept in which the input signal is directly mixed with an oscillator signal of the same carrier frequency and thus demodulated. The Audion already worked on this principle in the 1920s for those who desired to receive Morse signals. The problem with conventional direct mixers is the lack of image frequency suppression, i.e. a sine signal 1 kHz below the oscillator frequency provides exactly the same output signal as a sine signal 1 kHz above the oscillator frequency. An SDR solves this problem by "complex" signal processing, i.e. by calculating with real and imaginary parts, which is also called I/Q signal. The I stands for "in phase" and the real part. Q stands for Quadrature and for the imaginary part of the signal. For this purpose, two parallel mixing stages are used in the input section of the direct mixer receiver, whose oscillator signals are phase-shifted by 90°. Such oscillator signals are very easy to generate with digital technology. The output signals of the two mixers are digitized in parallel and then digitally processed—wherein the Hilbert transformation plays a central role. Ultimately, the Hilbert transformation produces a frequency-dependent delay without influencing the signal amplitude, so that the signal is turned by 90° in phase. A 1 kHz signal is thus delayed by 250 µs, a 10 kHz signal by 25 µs. At the end, two direct superimposition signals with 0° phase shift and with 90° phase shift are available. By adding or subtracting the two signals, one can switch between the two sidebands.

Furthermore, the system comprises at least one second electroacoustic transducer connected to a resonator, wherein the first electroacoustic transducer and the second electroacoustic transducer form an acoustic channel and the second electroacoustic transducer forms a passive cooperative target with the resonator, which target transmits a response signal via the acoustic channel when receiving an interrogation signal from the interrogation unit, the interrogation signal having a higher energy than the response signal.

Also, an inventive system may include an interrogation unit which is a software-defined interrogation unit in the manner of the software-defined radio.

Also, in a system according to the invention, the first and/or the second electroacoustic transducer may be a preferably bidirectional acoustic transducer, preferably for ultrasound or infrasound.

In a system according to the invention, the resonator is a resonator with a high Q-factor.

Furthermore, in a system according to the invention, the resonator can store at least a part of the energy of the interrogation signal due to its high quality factor until an environmentally induced signal reflection of the interrogation signal has decayed.

In a system according to the invention, the resonator can be a piezoelectric, thin-film resonator, a dielectric resonator or a quartz tuning fork resonator.

The resonator can also be a one-port resonator.

Furthermore, in the scope of the invention, the resonator may have at least one resonance frequency as a function of a measured variable, the resonance frequency being temperature response-compensated.

In a system according to the invention, it had proved to be particularly advantageous if the response signal is shifted in frequency in relation to the interrogation signal.

In a system according to the invention, the interrogation signal, preferably as at least one rectangular interrogation pulse and/or a beat signal and/or a frequency-modulated interrogation signal, is transmitted by the interrogation unit.

In the context of the invention, an interrogation pulse may be a pulse or signal with a rectangular envelope in the time domain.

Furthermore, in the context of the invention, an interrogation pulse may be a pulse or signal with a rectangular amplitude in the time domain.

Also, in the context of the invention, an interrogation pulse may be a pulse or signal with rectangular power in the time domain.

Furthermore, an interrogation signal within the scope of the invention may be an interrogation signal whose frequency is periodically increased and decreased with a wide beat signal (beat signal or also called dither signal in the technical literature).

If this frequency modulated interrogation signal passes above the resonance frequency of the transponder each time, the response signal is increased at resonance, and otherwise decreased. The envelope of the response signal has twice the frequency of the beat signal, since it is lowered at both the maximum and minimum frequency. If in the receiver the frequency of the interrogation signal is locked to the maximum of the second harmonic of the beat frequency in the response signal, a PLL can be established which allows an extremely accurate measurement.

According to the invention, the frequency-modulated signal can be converted into an amplitude-modulated signal. The details of this wireless conversion from frequency modulation to amplitude modulation by high-frequency resonators for the accurate determination of the resonance frequency of passive acoustoelectronic sensors based on, wherein the emitted frequency modulated high-frequency pulses are generated by a pulsed radar for scanning a surface wave based sensor. The sharp sign transition of the amplitude-modulated received signal provides a signal to which a feedback loop is adjusted to monitor the resonance signal.

Because of its transfer function, a resonator acts like a frequency-amplitude modulation converter. Due to excitation of a narrow band resonator away from its resonance frequency with an FM signal at a rate of the angular frequency ω on one of the resonance edges, the returned signal is an amplitude modulated at ω.

At resonance frequency, where the first order coefficient for a polynomial development of the transfer function becomes zero and the second order coefficient becomes dominant, the frequency modulation at ω becomes an amplitude modulation at 2ω, with a contribution at ω close to zero. Above the resonance frequency, the frequency modulation at ω becomes an amplitude modulation at ω again, but this time with a 90° phase shift of the amplitude modulation with respect to the frequency modulation signal compared to the previous case.

In the context of the invention, the interrogation signal, preferably as at least one rectangular interrogation pulse, may be transmitted by a signal source other than the interrogation unit.

In a system according to the invention, the passive cooperative target does not comprise any active electronic components. This has the advantage that the system can be used in harsh conditions such as in an environment with very high temperatures, or even under water.

In a system according to the invention, the passive cooperative target does not include its own energy source. This has the advantage that no battery is needed. It is also not necessary to transmit energy via inductive transmission or via so-called near field communication (NFC systems). This makes the system completely energy-autonomous and allows it to be used in harsh conditions such as in an environment with very high temperatures, or even under water.

Furthermore, in a system according to the invention, the passive cooperative target generates its energy required for sending the response signal from the interrogation signal via the acoustic channel. This makes the system completely energy-autonomous and allows it to be used in harsh conditions such as in an environment with very high temperatures, or even under water.

The applicability of a system according to the invention under water as well as in an environment where, for example, one component of the system, either the interrogation unit or the passive cooperative target, is located inside a Faraday cage, is possible thanks to the acoustic channel. This acoustic channel in the sense of the invention is preferably formed by acoustic signals which can be in a frequency range from 1 kHz to 10 THz, preferably a first frequency range of 1 kHz to 10 kHz, in particular 3 kHz to 5 kHz, or 5 kHz to 10 kHz, or in a second frequency range from 10 kHz to 50 kHz, in particular 10 kHz to 19 kHz, or 19 kHz to 50 kHz, in particular 20 kHz to 45 kHz or 20 kHz to 25 kHz or 25 kHz to 44 kHz or 44 kHz to 45 kHz, or a third frequency range from 50 kHz to 250 kHz, in particular 50 kHz to 100 kHz, or 100 kHz to 250 kHz, or in a fourth frequency range from 250 kHz to 1 MHz, or in a fifth frequency range from 1 MHz to 10 MHz, or in a sixth frequency range from 10 MHz to 100 MHz, or in a seventh frequency range from 100 MHz to 400 MHz, or in a seventh frequency range 400 MHz to 600 MHz, or in an eighth frequency range from 600 MHz to 900 MHz, or in a ninth frequency range from 900 MHz to 1 GHz, or in a tenth frequency range from 1 GHz to 5 GHz, or in a further frequency range from 5 GHz to 10 GHz, or also in a frequency range from 1 mHz to 1 kHz, particularly 1 mHz to 0.5 Hz, or 0.5 Hz to 1 Hz, particularly preferably 1 Hz to 500 Hz, particularly 1 Hz to 100 Hz, preferably also 70 Hz to 95 Hz, or also 100 Hz to 250 Hz, or also 250 Hz to 1 kHz, and in further frequency ranges from 20 Hz to 20 kHz, or 20 kHz to 1 GHz, or even 1 GHz to 10 THz.

Sound- and/or Ultrasonic-Coupled Passive Wireless Vibration Sensor System

This publication presents for the first time an instrumentation method for the passive extraction of a resonance frequency of a high-Q resonator via a wireless ultrasonic channel. As a first application, a passive wireless temperature measurement is presented with a proof of the wireless and passive operation of the device. Temperature resolution of 0.17° C. and a measurement range of 350 mm were demonstrated.

Passive wireless sensing is an instrumentation method which enables an analog wireless measurement of a transducer element.

In the age of the Internet of Things, this technology has a fair chance to move from the current niche of industrial sensor technology for harsh environments into the mainstream market. Conventional wireless communication based on electromagnetic wave propagation is ineffective in situations where the sensor node is located in a conductive housing, i.e. Faraday cage, so a method based on ultrasound propagation was recently proposed in the publication Hagelauer, A.; Ussmueller, T.; Weigel, R. SAW and CMOS RFID transponder-based wireless systems and their applications. In Proceedings of the 2012 IEEE International Frequency Control Symposium (FCS), Baltimore, Md., USA, 21-24 May 2012; pp. 1-6.

This principle of ultrasonic propagation is described in detail in the publication of Hagelauer, A.; Ussmueller, T.; Weigel, R. SAW and CMOS RFID transponder-based wireless systems and their applications. In Proceedings of the 2012 IEEE International Frequency Control Symposium (FCS), Baltimore, Md., USA, 21-24 May 2012; pp. 1-6. which reference is explicitly made here.

The work presented here is an attempt to investigate a chip-free approach by fitting a tuning fork resonator with an ultrasonic transducer. First, the concept of wireless interrogation of high-Q resonators is discussed, followed by a description of the experiment which tests the following hypothesis: can ultrasonic transducers and crystal resonators be used as passive wireless sensors? This is then followed by a characterization of the sensing element and a subsequent analysis of its performance.

Concept for the Wireless Sensor System

Similar to wireless passive measurement with an antenna coupled to surface acoustic wave devices, the approach presented is based on a time domain separation of the transmitted and reflected signal, is discussed in the publication by Reindl, L.; Scholl, G.; Ostertag, T.; Scherr, H.; Wolff, U.; Schmidt, F. Theory and application of passive SAW radio transponders as sensors. IEEE Trans. Ultrason. Ferroelectr. Freq. Control 1998, 45, 1281-1292. in its details concerning wireless passive detection with surface acoustic wave devices, which is explicitly referred to here, the presented approach is based on a time domain separation of the transmitted and reflected signal. The wireless sensor system contains an excitation and receiving element with signal processing on the active part and a transceiver with an oscillating load on the passive sensor-node. The passive sensor node consists of a resonator electrically connected to a radiating element, i.e. an ultrasonic transducer. Quality factor, the main quality factor for a resonator in this application, is defined as:

$$Q = \frac{\omega_0 W}{P}$$

where $\omega_0$ is the resonance frequency, W is the energy stored in the resonator, and P is the power dissipation. In resonators coupled to a radiating element, the power loss due to internal material and resistance losses is low, and the oscillation time can be longer than ambient echoes, such that a channel-invariant measurement of the resonance frequency is possible wirelessly.

Figure 1:
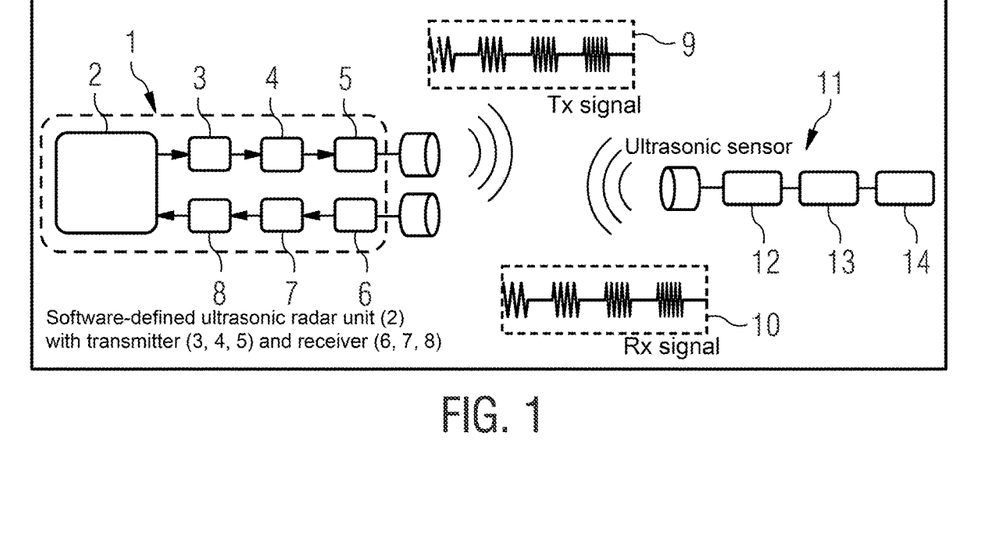
FIG. 1 is a schematic diagram of a system according to the invention, having a software-defined radar as interrogation unit.

FIG. 1 Basic concept of a wireless reading of a resonance frequency by means of ultrasonic wave propagation.

External environmental influences, such as temperature, influence material properties like the stiffness tensor of a piezoelectric resonator. This causes a frequency shift of the resonance mode, as explained by harmonic disturbance theory. This effect can be used for temperature measurement—passively, via a wireless connection—and is demonstrated in section 4.

It is also possible within the scope of the invention to allocate an identification feature (an ID) to a passive cooperative target in order to enable identification and thus enable the allocation of a measured value to a specific measuring point. Details on the mode of operation and implementation of signal interrogation and coding as well as the type, design and mode of operation of the resonators of such a combined identification and/or sensor system are described in DE 44 13 211 A1, which is expressly referred to here.

Furthermore, details of the mode of operation and implementation of the signal interrogation and coding as well as the type, construction and mode of operation of the resonators of such a combined identification and/or sensor system are described in U.S. Pat. No. 5,691,698 which is expressly referred to here.

Furthermore, details of the mode of operation, design and implementation of the interrogation unit as well as the type, design and mode of operation of the transducers in the case of ultrasonic transducers of such a combined identification and/or sensor system are described in U.S. Pat. No. 7,061,381 B2 to which explicit reference is made here.

Furthermore, details of the operation, construction and implementation of the interrogation unit, the signal interrogation, the signal transmission of the interrogation signal as well as the type, construction and operation of the energy storage within the resonator in the case of the reception of scattered signals from the environment with a longer propagation time than the unscattered original interrogation signal in the case of electromagnetic signals, which is to be applied analogously to the scattering of acoustic signals with regard to the physical principle of signal scattering within the scope of the invention, are described in detail in DE 10 057 059 A1, to which explicit reference is made here.

Concept Design

Figure 2:
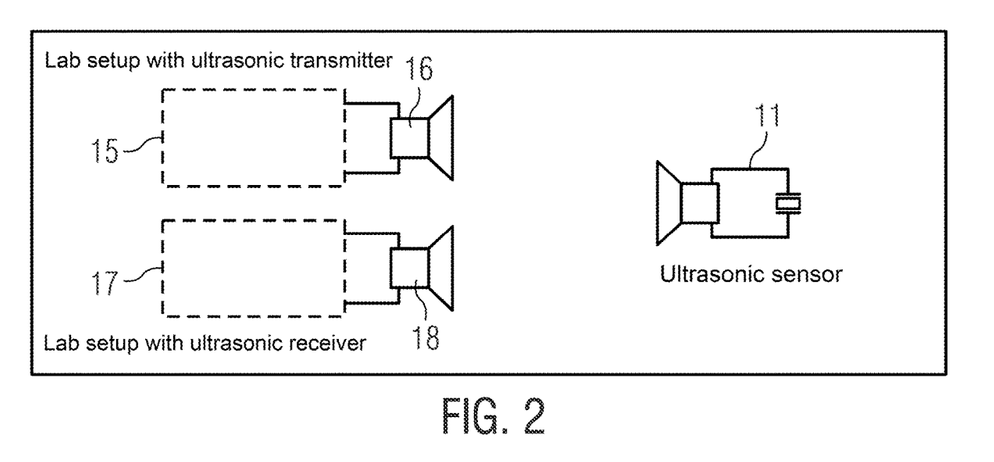
FIG. 2 is a schematic diagram of the measurement setup concept design.

The main focus for the concept design is the passive extraction of a resonance frequency with wireless ultrasound interrogation. A temperature compensated quartz tuning fork resonator with a high Q is used. For the realization of the sensor system a temperature measuring tuning fork resonator will be presented later in this publication. The instrumentation setup is shown in FIG. 2. The commercially available electronic components have a center frequency of 40 kHz and were analyzed with a highly accurate impedance measurement.

FIG. 2 Measurement setup with laboratory equipment for the concept design with a tuning fork resonator.

Figure 3:
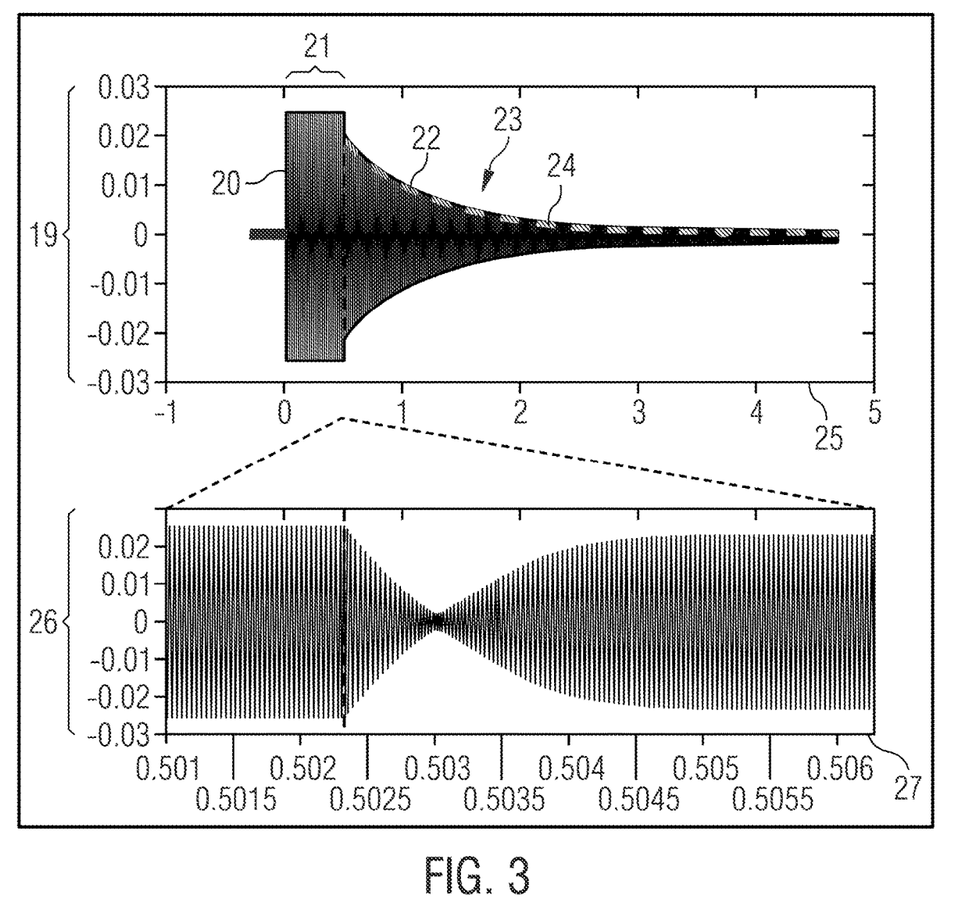
FIG. 3 is a time domain measurement of the received signal (returned signal).

A pulse with a width of 0.5 s is applied to the transmitter, resulting in a bandwidth of 2.4 Hz around the resonance. This causes the high-Q resonator to oscillate, which enables time domain separation of Tx and Rx. FIG. 3 shows the measured time domain signal at the ultrasonic receiver. The excitation frequency decays in less than 2 ms after the burst and the high-Q resonator begins to oscillate at its resonance frequency. The presented concept comprises the frequency shift from the excitation to the resonance frequency. A backscattered signal could be measured with a channel power of 36 dBmV over a distance of 350 mm at 100 ms burst at 2Vpp with and SNR of 10 dB.

FIG. 3. Backscattered signal: (a) excitation pulse width of 0.502 s and ringing of the high-Q-factor resonator at resonance frequency with envelope matching (red dashed line) for decay for Q-factor calculation; (b) shift from excitation frequency to resonance frequency.

Sensor Characterization

The sensor used is a temperature measuring oscillator (TSXO), which is designed as a tuning fork resonator. With its high Q factor and a low frequency in the kHz range, it achieves long oscillation times. For the measurement in FIG. 4, a temperature ramp of $-30°$ C. to $+90°$ C. is applied to the resonator in a climate chamber. It is sampled using the burst-mode technique and the temperature-dependent resonance frequency is measured with a superimposed FFT in an unconstrained time frame, shown in FIG. 3a as a red area. The excitation frequency is adjusted via the temperature ramp by setting it to the previously obtained resonance frequency, completing the feedback chain of the presented digitally controlled phase-locked loop. This principle of the excitation frequency being adjusted via the temperature ramp, by setting it to the previously obtained resonance frequency, completing the feedback chain of the presented digitally controlled phase-locked loop for measuring oscillators or resonators, is described in its details in the publication of Pohl, A.; Ostermayer, G.; Seifert, F. Wireless sensing using oscillator circuits locked to remote high-Q SAW resonators. IEEE Trans. Ultrason. Ferroelectr. Freq. Control 1998, 45, 1161-1168 which is explicitly referred to here.

Figure 4:
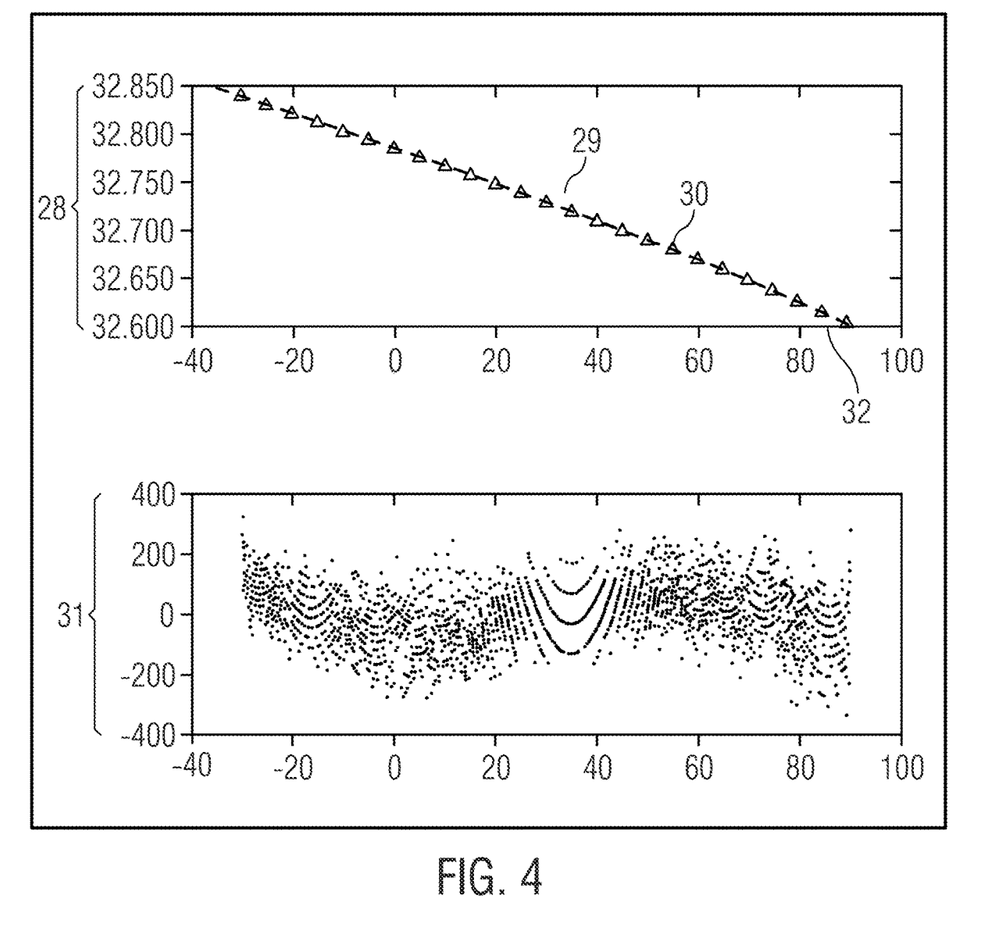
FIG. 4 (top) characteristic of the sensor element as a function of temperature.
Figure 5:
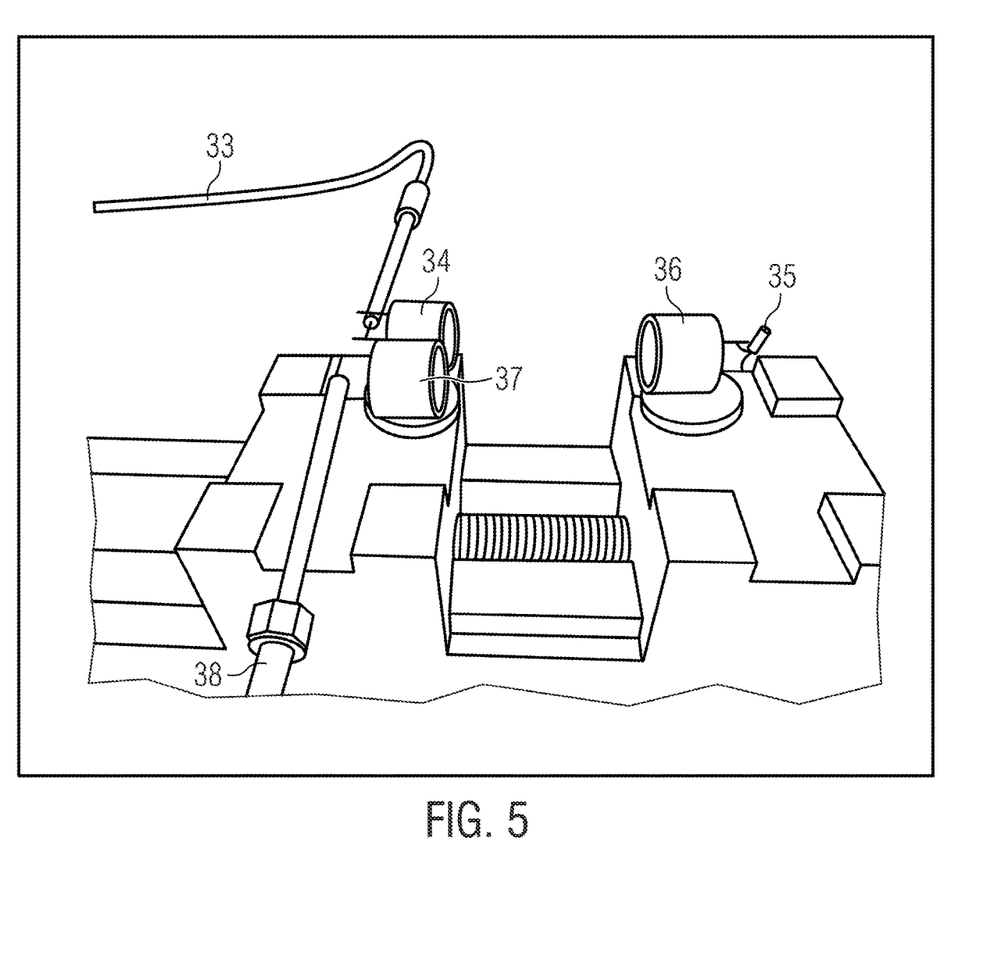
FIG. 5 is an illustration of a measurement setup.
Figure 6:
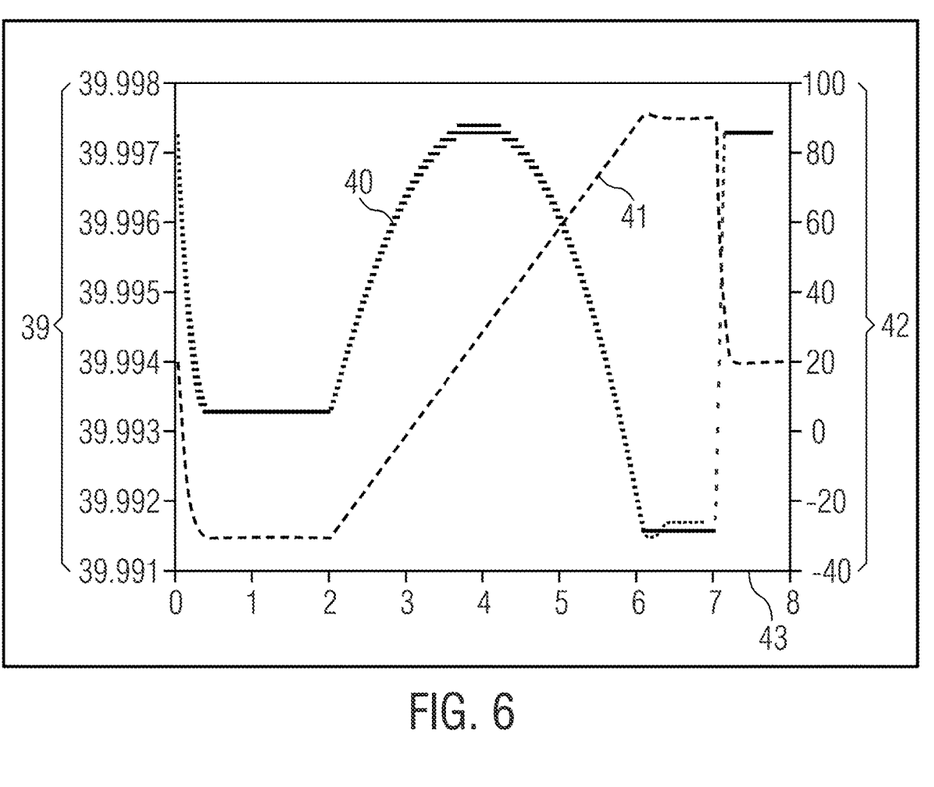
FIG. 6 is a measurement diagram of the resonance frequency versus temperature for a 32.8 kHz resonator.

FIG. 4: (a) Characterization of the resonance frequency of the sensing element as a function of temperature with square fit (b) remainders of the fitted curve in mHz.

The TSXO shows a quadratic temperature response with a sensitivity of $-1.94$ Hz/$°$ C. at $25°$ C. The equalization curve has a value for R square of 1.0 and 4.3552 as the norm for residuals with 1819 points. The parabolic patterns in the residuals suggest that the main reason for the residuals is due to the quantization error of the temperature sensor used as reference with a resolution of $0.1°$ C. The currently used FFT frequency bandwidth resolution of 0.34 Hz limits the temperature resolution to $0.17°$ C.

As Cramer Rao bound as in the publication Kalinin, V. Comparison of frequency estimators for interrogation of wireless resonant SAW sensors. In Proceedings of the 2015 Joint Conference of the IEEE International Frequency Control Symposium & the European Frequency and Time Forum, Denver, Colo., USA, 12-16 Apr. 2015; pp. 498-503 with regard to signal processing and signal evaluation for acoustic components is described in detail, and which is explicitly referred to here, is significantly less, a better resolution for temperature can be achieved.

Conclusion

This work presented an instrumentation method for extracting a resonance frequency of a high-Q resonator via a wireless ultrasonic channel. In addition to a draft concept of the wireless and passive operation of the device, a passive wireless temperature measurement is presented. Temperature resolution of $0.17°$ C. and a measurement range of 350 mm were demonstrated. It has been shown that a design and implementation of the presented system requires a careful tuning of the resonance frequency and the impedance between the transducer and the resonator. In addition, and depending on the noise levels of the environment, the Q-factor of the resonator must be high (~100,000) for precise wireless extraction of the resonance frequency. The new wireless detection technology presented in this paper has significant potential applications with respect to measurements on moving parts, within closed cavities and in submerged environments.

BRIEF DESCRIPTION OF THE DRAWINGS

The invention is explained in more detail below with reference to exemplary embodiments shown in the figures, wherein:

FIG. 4 (bottom) a received signal analysis.

DETAILED DESCRIPTION OF THE PREFERRED EMBODIMENTS

FIG. 1: Measurement setup with a signal generator as software-defined radar functioning as an interrogation unit for emitting an acoustic signal via an acoustic transducer, designed in this case as an ultrasonic transducer. The ultrasonic transducer sends the acoustic signal via the acoustic channel to the further acoustic transducer, which is connected to a resonator as a cooperative passive target. The resonator stores the received interrogation signal, respectively the energy of the acoustic signal which has been converted into electrical energy by the electroacoustic transducer (specifically, the resonator), until signals from the environment have decayed. The resonator then converts the electrical energy back into acoustic energy and transmits it via the acoustic channel to the first acoustic transducer. Wireless experimental setup: This measurement is carried out at a distance of 50 mm with a 10 Vss interrogation source. A range of up to 1 km was achieved by the authors.

LIST OF REFERENCE NUMERALS

1 Software defined ultrasonic radar
2 Microcontroller
3 DAC
4 Filter
5 Tx AMP
6 Rx AMP
7 Filter
8 ADC
9 Tx Signal
10 Rx Signal
11 Ultrasonic sensor/label
12 Adjustment
13 Resonator
14 Load
15 Function Generator Tektronix AFG3102
16 Ultrasonic transmitter
17 Oscilloscope Rohde & Black RTO1044
18 Ultrasonic receiver
19 Instrumentation voltage (V)
20 Excitation frequency=39995.20 Hz
21 Pulse duration=0.502 seconds
22 Resonance frequency=39996.56 Hz
23 Decay time=0.502 seconds
24 Quality factor=101788
25 Time (s)
26 Instrumentation voltage (V)
27 Time (s)
28 Resonance frequency (kHz)
29 32.718 kHz Resonator
30 Quadratic curve fitting
31 Residuals of quadratic curve fitting (mHz)
32 Temperature (° C.)
33 Function generator
34 Ultrasonic transmitter
35 Ultrasonic receiver
36 Oscilloscope
37 Resonator
38 Ultrasonic converter
39 Determined resonance frequency (kHz)
40 DUT Response
41 Pt100 Reference
42 Temperature (° C.)
43 Time (hours)

The invention claimed is:

1. A system comprising a first electroacoustic transducer connected to an interrogation unit and at least one second electroacoustic transducer connected to a resonator, wherein the first electroacoustic transducer and the second electroacoustic transducer form an acoustic channel and the second electroacoustic transducer forms with the resonator a passive cooperative target which, upon receiving an interrogation signal from the interrogation unit, transmits a response signal via the acoustic channel, and the interrogation signal has a higher energy than the response signal.

2. The system according to claim 1, wherein the interrogation unit is a software defined interrogation unit.

3. The system according to claim 1, wherein the first and/or the second electroacoustic transducer is an acoustic transducer for ultrasound or infrasound.

4. The system according to claim 3, wherein the first and/or the second electroacoustic transducer is a bidirectional acoustic transducer.

5. The system according to claim 1, wherein the resonator is a resonator with a high Q-factor.

6. The system according to claim 1, wherein the resonator stores at least a part of the energy of the interrogation signal due to the high Q-factor until an environmentally induced signal reflection of the interrogation signal has decayed.

7. The system according to claim 1, wherein the resonator is a thin-film resonator, a piezoelectric thin-film resonator, a dielectric resonator, or a quartz tuning fork resonator.

8. The system according to claim 1, wherein the resonator is a single-port resonator.

9. The system according to claim 1, wherein the resonator has at least one resonance frequency as a function of a measured quantity.

10. The system according to claim 9, wherein the resonance frequency is temperature-response compensated.

11. The system according to claim 1, wherein the response signal is shifted in frequency relative to the interrogation signal.

12. The system according to claim 1, wherein the interrogation signal is transmitted by the interrogation unit.

13. The system according to claim 12, wherein the interrogation signal is transmitted by the interrogation unit as at least one rectangular interrogation pulse and/or a beat signal and/or a frequency-modulated interrogation signal.

14. The system according to claim 1, wherein the interrogation signal is transmitted by a signal source other than the interrogation unit.

15. The system according to claim 14, wherein the interrogation signal is transmitted as at least one rectangular interrogation pulse.

16. The system according to claim 1, wherein the passive cooperative target does not comprise active electronic components.

17. The system according to claim 1, wherein the passive cooperative target does not comprise its own energy source.

18. The system according to claim 1, wherein the passive cooperative target generates its energy required to transmit the response signal from the interrogation signal via the acoustic channel.

19. The system according to claim 1, wherein the acoustic channel is located in a frequency range from 1 kHz to 10 THz.

20. The system according to claim 19, wherein the acoustic channel is located in a first frequency range of 1 kHz to 10 kHz, or in a second frequency range from 10 kHz to 50 kHz, or in a third frequency range from 50 kHz to 250 kHz, or in a fourth frequency range from 250 kHz to 1 MHz, or in a fifth frequency range from 1 MHz to 10 MHz, or in a sixth frequency range from 10 MHz to 100 MHz, or in a seventh frequency range from 100 MHz to 400 MHz, or in an eighth frequency range from 400 MHz to 600 MHz, or in a ninth frequency range from 600 MHz to 900 MHz, or in a tenth frequency range from 900 MHz to 1 GHz, or in an eleventh frequency range from 1 GHz to 5 GHz, or in a further frequency range from 5 GHz to 10 GHz.

21. The system according to claim 19, wherein the acoustic channel is located in a frequency range of 3 kHz to 5 kHz, or 5 kHz to 10 kHz.

22. The system according to claim 19, wherein the acoustic channel is located in a frequency range of 10 kHz to 19 kHz, or 19 kHz to 50 kHz, or 20 kHz to 45 kHz, or 20 kHz to 25 kHz, or 25 kHz to 44 kHz, or 44 kHz to 45 kHz.

23. The system according to claim 19, wherein the acoustic channel is located in a frequency range of 50 kHz to 100 kHz, or 100 kHz to 250 kHz.

24. The system according to claim 19, wherein the acoustic channel is located in a frequency range from 1 mHz to 1 kHz, or 1 mHz to 0.5 Hz, or 0.5 Hz to 1 Hz, or 1 Hz to 500 Hz, or 1 Hz to 100 Hz, or 70 Hz to 95 Hz, or 100 Hz to 250 Hz, or 250 Hz to 1 kHz.

25. The system according to claim 19, wherein the acoustic channel is located in a frequency range from 20 Hz to 20 kHz, or 20 kHz to 1 GHz, or 1 GHz to 10 THz.

* * * * *